(12) United States Patent
Galovic

(10) Patent No.: US 6,787,208 B2
(45) Date of Patent: Sep. 7, 2004

(54) DISSOLVABLE ADHESIVE ARTICLE

(75) Inventor: Daniel C. Galovic, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 49 days.

(21) Appl. No.: 10/193,612

(22) Filed: Jul. 11, 2002

(65) Prior Publication Data

US 2003/0012910 A1 Jan. 16, 2003

Related U.S. Application Data

(60) Provisional application No. 60/305,665, filed on Jul. 16, 2001.

(51) Int. Cl.[7] .................................................. B32B 9/00
(52) U.S. Cl. .................... 428/40.1; 428/41.3; 428/41.4; 428/41.5; 428/41.7; 428/343; 428/352; 428/355; 428/906
(58) Field of Search ................. 428/40.1, 41.3, 428/41.4, 41.5, 41.7, 343, 352, 355, 906

(56) References Cited

U.S. PATENT DOCUMENTS

| | | | |
|---|---|---|---|
| 3,431,166 A | 3/1969 | Mizutani et al. | ............ 162/135 |
| 4,413,082 A | 11/1983 | Gleichenhagen et al. | ... 524/243 |
| 4,426,490 A | 1/1984 | Dallavia, Jr. et al. | ........ 524/837 |
| 4,476,241 A | 10/1984 | Dallavia, Jr. et al. | ........ 502/156 |
| 5,395,907 A | 3/1995 | Zajaczkowski | ............. 526/320 |
| 5,397,614 A | 3/1995 | Patnode et al. | ............... 428/40 |
| 5,612,137 A | 3/1997 | Scholz | ....................... 428/355 |
| 6,136,903 A | 10/2000 | Su et al. | ..................... 524/167 |
| 6,294,038 B1 * | 9/2001 | Majkrzak | .................... 427/146 |
| 6,294,238 B1 | 9/2001 | Pomplun et al. | ........... 428/41.8 |

FOREIGN PATENT DOCUMENTS

| JP | 48-99405 | 12/1973 |
|---|---|---|
| WO | 01/463329 A1 | 6/2001 |

* cited by examiner

*Primary Examiner*—Nasser Ahmad
(74) *Attorney, Agent, or Firm*—Renner, Otto, Boisselle & Sklar, LLP

(57) ABSTRACT

A linerless dissolvable pressure sensitive adhesive article is provided. The adhesive article comprises: a dissolvable facestock; a dissolvable adhesive layer; and a release coating overlying the upper surface of the dissolvable facestock. The linerless dissolvable adhesive article may be provided in a wound configuration or a stacked configuration.

15 Claims, 1 Drawing Sheet

DISSOLVABLE ADHESIVE ARTICLE

CROSS REFERENCE TO RELATED APPLICATIONS

This application claims the benefit of provisional application 60/305,665 filed on Jul. 16, 2001, which is hereby incorporated herein by reference in its entirety.

FIELD OF THE INVENTION

This invention relates to dissolvable adhesive articles, and more particularly, to linerless dissolvable labels and tapes. This invention further relates to the process for manufacturing the linerless dissolvable adhesive articles.

BACKGROUND OF THE INVENTION

Linerless labels and tapes are typically manufactured by applying a pressure sensitive adhesive to the back side of a paper or synthetic continuous substrate or web and then applying a release coating to the face side of the substrate. The resultant article is then wound upon itself to form a roll. The release coating on the face of the substrate permits the article to be unwound without the adhesive sticking to the substrate.

The typical process for manufacturing linerless labels and tapes is difficult to use when the substrate is a dissolvable paper. Dissolvable papers generally have low web strength and tear easily during subsequent processing steps, such as those required for producing linerless labels and tapes, and for winding the linerless tape and labels into a roll. It is desirable, therefore, to provide a dissolvable linerless adhesive article that can be wound upon itself, and then unwound while maintaining its integrity.

SUMMARY OF THE INVENTION

The present invention is directed to a linerless dissolvable pressure sensitive adhesive article comprising: a dissolvable facestock having an upper surface and a lower surface; a dissolvable adhesive layer having an upper and a lower surface wherein the upper surface of the adhesive layer is adhered to the lower surface of the dissolvable facestock; and a release coating overlying the upper surface of the dissolvable facestock.

The present invention is further directed to a method for producing a linerless dissolvable adhesive article comprising the steps of:

applying a dissolvable pressure sensitive adhesive to a release liner having a release surface to form an adhesive layer releasably adhered to the release surface of the release liner;

applying a dissolvable facestock to the adhesive layer;

applying a release material to the dissolvable facestock to form a release layer on the dissolvable facestock;

removing the release liner from the dissolvable pressure sensitive adhesive to form a multilayer structure comprising a dissolvable facestock having an upper and lower surface, a release layer on the upper surface of the facestock and a dissolvable adhesive layer adhered to the lower surface of the facestock; and winding the multilayer structure into a roll.

DETAILED DESCRIPTION OF THE INVENTION

In one embodiment, the invention relates to a dissolvable pressure sensitive adhesive construction comprising a dissolvable paper facestock, a water-soluble adhesive layer in contact with one surface of the facestock, and a release coating on the opposite surface of the facestock.

Figure 1:
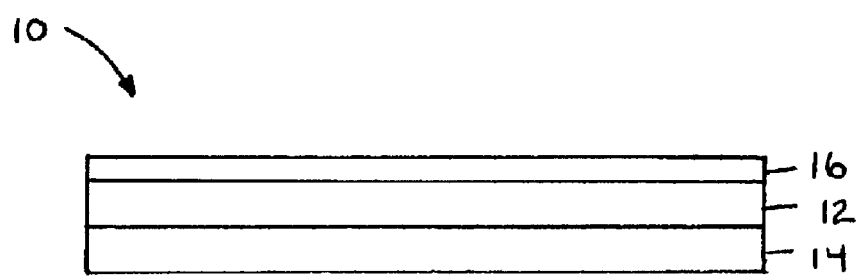
FIG. 1 is a schematic illustration of a side view of an adhesive article construction of the present invention.

FIG. 1 is a schematic illustration of a side view of an adhesive article construction 10 of the present invention. The article construction 10 comprises a dissolvable facestock 12 having an upper surface and a lower surface; a water-soluble adhesive layer 14 having an upper surface and a lower surface wherein the upper surface of the adhesive layer 14 is in contact with the lower surface of facestock 12; and a release coating 16 having an upper surface and a lower surface wherein the lower surface of the release coating is in contact with the upper surface of the facestock 12.

The facestock for the dissolvable adhesive article is one that is intentionally made of low web strength, and that disintegrates or disperses upon contact with water. Dissolvable paper facestocks may be produced by a manufacturing process in which an organic solvent is employed to treat the paper to reduce surface tension, after which the paper is dried at a relatively low temperature. Subsequently, the dry strength of the paper may be improved, without increasing its wet strength, by treating it with a remoisturizing bonding agent, such as carboxymethyl cellulose or lower alkyl cellulose. Processes for manufacturing such quick dissolving paper are described in Japanese Patent No. 4899405 (Application No. 4733457) of Mishima Seishi, Ltd. Another method for making such a readily dissolvable paper is described in U.S. Pat. No. 3,431,166, assigned to Mishima Paper Manufacturing Co., Ltd., which is incorporated herein by reference. An example of a useful dissolvable facestock is DISSOLVO dissolving paper, which is a wood-free paper manufactured by Mishima. A particularly useful dissolvable paper is commercially available from Mishima under the designation 60#MDP-S Dissolvable Paper.

In another embodiment, the facestock for the dissolvable adhesive article comprises a dissolvable film. The dissolvable film is a polymeric film that loses integrity over time in the presence of water and includes, but is not limited to polyalkylene oxides, such as polyethylene oxide, and ethylene oxide/propylene oxide copolymers, polymethacrylic acid, polymethacrylic acid copolymers, polyvinyl alcohol, poly(2-ethyl oxazoline), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly(n-isopropyl acrylamide), poly N-vinyl caprolactam, polyvinyl methyl oxazolidone, poly (2-isopropyl-2-oxazoline), and poly (2,4-dimethyl-6-triazinyl ethylene).

The dissolvable facestock may also be made by combining various different types of dissolvable film materials. In some embodiments, it may be desirable to incorporate one or more additives into the dissolvable facestock material including, but not limited to, compatibilizers, processing aids, plasticizers, tackifiers, detackifiers, slip agents, and antimicrobial agents.

The pressure sensitive adhesive layer may comprise any water-soluble or water dispersible formulation used in pressure sensitive adhesive applications, including water-based, acrylic emulsions and latex formulations. In one embodiment, the adhesive layer of the present invention is an acrylic emulsion based adhesive. Such adhesives are described in WO 01/46329, the disclosure of which is incorporated herein by reference. Other useful adhesives include copolymers of a carboxylic hydroxyalkyl ester monomer and an ethoxylated or propoxylated hydrocyalkyl (meth)acrylate. Such adhesives are described in U.S. Pat. No. 5,395,907, the disclosure of which is incorporated herein by reference.

A particularly useful dissolvable pressure sensitive adhesive is an acrylic emulsion adhesive comprising a copolymer formed from a plurality of monomers comprising at least one alkyl (meth)acrylate, at least one N-vinyl lactam monomer and at least one hydroxy (meth)acrylate ester.

Polymer molecular weight is an important property of the acrylic emulsion adhesive and should be controlled for optimum performance. Useful adhesive copolymers according to the present invention have relatively low weight-average molecular weights (Mw), generally less than about 120,000. In one embodiment, the molecular weight is within the range of about 40,000 to about 100,000. In another embodiment, the molecular weight is within the range of from about 55,000 to about 90,000. It is desirable that the molecular weight of the polymer be generally less than 120,000 because larger polymers tend to cause grit, decreasing the dissolvability of the polymer. The low molecular weight polymers of the acrylic emulsion adhesive can be obtained using n-dodecyl mercaptan or another suitable chain transfer agent.

Examples of suitable N-vinyl lactam monomers for use in the acrylic emulsion adhesive include N-vinyl-2-pyrrolidone, 5-methyl-N-vinyl-2-pyrrolidone, 5-ethyl-N-vinyl-2-pyrrolidone, 3,3-dimethyl-N-vinyl-2-pyrrolidone, 3-methyl-N-vinyl-2-pyrrolidone, 3-ethyl-N-vinyl-2-pyrrolidone, 4-methyl-N-vinyl-2-pyrrolidone, 4-ethyl-N-vinyl-2-pyrrolidone, 1-vinyl-2-piperidone, N-vinyl-2-valerolactam, N-vinyl-2-caprolactam, and mixtures thereof. In one embodiment, the N-vinyl lactam monomer (or mixture of N-vinyl lactam monomers) is present in the monomer mixture in a total amount ranging from about 1% to about 15% by weight. In another embodiment, the N-vinyl lactam monomer (or mixture of N-vinyl lactam monomers) is present in the monomer mixture in a total amount ranging from about 4% to about 12% by weight, and in another embodiment from about 6% to about 9% by weight, based on the total weight of the monomer mixture.

Examples of suitable hydroxy (meth)acrylate esters for use in the present invention include hydroxymethyl acrylate, hydroxyethyl acrylate, hydroxypropyl acrylate, hydroxybutyl acrylate, hydroxymethyl methacrylate, hydroxyethyl methacrylate, hydroxypropyl methacrylate, and hydroxybutyl methacrylate. In one embodiment, the hydroxy (meth) acrylate ester (or mixture of hydroxy (meth)acrylate esters) is present in the monomer mixture in a total amount ranging from about 1% to about 15% by weight, based on the total weight of the monomer mixture. In another embodiment the hydroxy (meth)acrylate ester (or mixture of hydroxy (meth) acrylate esters) is present in the monomer mixture from about 1% to about 9% by weight, and in another embodiment, from about 3% to about 9%, based on the total weight of the monomer mixture.

Useful alkyl (meth)acrylates include methyl acrylate, ethyl acrylate, butyl acrylate, 2-ethylhexyl acrylate, isooctyl acrylate, isononyl acrylate, isodecyl acrylate, methylbutyl acrylate, 4-methyl-2-pentyl acrylate, butyl methacrylate, 2ethylhexyl methacrylate, isooctyl methacrylate and mixtures thereof. In one embodiment, the one or more alkyl (meth)acrylates are present in the monomer mixture in a total amount ranging from about 35% to about 80% by weight, based on the total weight of the monomers. In another embodiment, the alkyl(meth)acrylates are present in an amount from about 50% to about 70% by weight, based on the total weight of the monomers.

In one embodiment of the present invention the dissolvable emulsion acrylic adhesive comprises a polymer formed from a plurality of monomers comprising (a) at least one N-vinyl lactam monomer present in an amount ranging from about 1% to about 15% by weight, based on the total weight of the monomers; (b) at least one hydroxy (meth)acrylate ester present in an amount ranging from about 1% to about 15% by weight, based on the total weight of the monomers; (c) at least one alkyl (meth)acrylate present in an amount ranging from about 35% to about 80% by weight, based on the total weight of the monomers; and (d) at least one ethylenically unsaturated carboxylic acid monomer present in an amount ranging from about 4% to about 15% by weight, based on the total weight of the monomers.

The polymer of the dissolvable emulsion acrylic adhesive may also comprise at least one modifying monomer present in an amount ranging from about 0.05% to about 3% by weight, based on the total weight of the monomers. Useful modifying monomers include nitrogen-containing heterocyclic methacrylates and internal crosslinkers. An example of a suitable nitrogen-containing heterocyclic methacrylate for use in the present invention is 1-2-methacryloxyethyl) imidazolidin-2-one (commercially available in a 50/50 mix with methyl acrylate under the name Norsocryl® 104, from Elf Atochem North America, Inc., Philadelphia, Pa.). Examples of suitable internal crosslinkers include multifunctional acrylates and methacrylates, such as diacrylates (ethylene glycol diacrylate, propylene glycol diacrylate, polyethylene glycol diacrylate, and hexanediol diacrylate), dimethacrylates (ethylene glycol diacrylate, diethylene glycol dimethacrylate, and 1,3 butane glycol dimethacrylate), triacrylates (trimethylolpropane trimethacrylate, ethoxylated trimethylolpropane triacrylate, and pentaerythritol triacrylate), and trimethacrylates (pentaerythritol trimethacrylate and trimethylolpropane trimethacrylate), as well as divinyl esters, such as divinylbenzene, divinyl succinate, divinyl adipate, divinyl maleate, divinyl oxalate, divinyl malonate, and divinyl glutarate.

The polymer of the dissolvable emulsion acrylic adhesive may also comprise at least one vinyl ester monomer present in an amount ranging from about 8% to about 18% by weight, based on the total weight of the monomers. Examples of suitable vinyl esters useful in the present invention include vinyl acetate, vinyl butyrate, vinyl propionate, vinyl isobutyrate, vinyl valerate, vinyl versitate and mixtures thereof.

The release coating that is applied to the upper surface of the facestock in one embodiment is a silicone coating. Useful silicone coatings include silicone emulsions coatings. Such silicone emulsions are described in U.S. Pat. Nos. 4,426,490 and 4,476,241 assigned to General Electric. A particularly useful silicone emulsion is an emulsion of polyvinyl siloxane and methyl hydrogen that is catalyzed on blending with a platinum catalyst. In one embodiment, a silicone emulsion release coating is prepared by blending a polyvinyl siloxane commercially available from General Electric under the designation SM-3200 with a platinum catalyst commercially available from General Electric under the designation SM-3010. The release coating may be applied to the facestock by, for example, gravure and reverse gravure coating.

The release coating may also comprise a polyalphaolefin including, but not limited to amorphous ethylene-propylene copolymers. Such release coatings are available from U.S. Rexene Company under the tradename REXTAC®.

In one embodiment of the present invention, the dissolvable linerless adhesive article is manufactured by first applying the adhesive to a release liner. The adhesive may be applied using conventional methods, including curtain, slide or spray coating or proximity coating methods. The coated adhesive is then air or oven dried. The adhesive is applied at a desirable coat weight (conveniently measured on a dried basis), which generally lies within the range of about 10 to about 50 grams per square meter (g/m$^2$ or gsm). In one embodiment, the adhesive is applied within the range of about 15 to about 25 gsm. The release liner that is utilized in this embodiment of the manufacturing process may comprise any of a variety of materials known to those skilled in the art to be suitable as release liners. In one embodiment, the release liner comprises a silicone coated paper substrate. Coated polymer film substrates also can be used as release liners.

The dissolvable facestock is then laminated to the adhesive coated release liner. After the facestock has been applied to the release liner, the exposed surface of the facestock is coated with a thin layer of a release material. The release material is then dried or cured. In one embodiment, a silicone emulsion release material is applied to the facestock by reverse gravure coating and then oven dried. The silicone emulsion is applied to the facestock at a coat weight (measured on a dried basis) within the range of about 0.5 gsm to about 2 gsm. In one embodiment, the silicone emulsion is applied to the facestock at a coat weight within the range of about 1.0 gsm to about 1.5 gsm.

Figure 2:
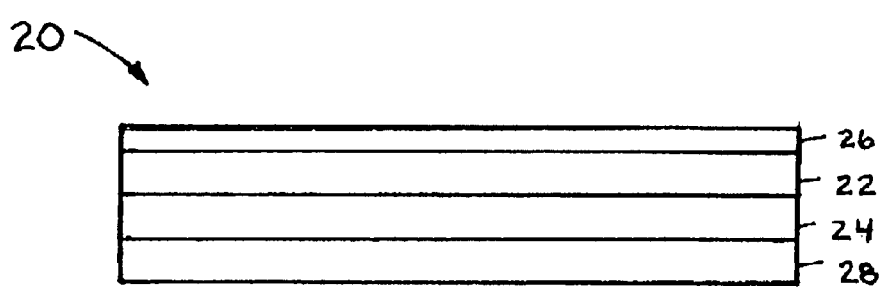
FIG. 2 is a schematic illustration of a side view of another adhesive article construction of the present invention containing a release liner.

FIG. 2 illustrates this intermediate product of this embodiment of the manufacturing process. Adhesive article construction 20 comprises a construction as illustrated in FIG. 1 with the addition of a release liner 28. More particularly, the construction 20 comprises: a dissolvable facestock 22 having an upper surface and a lower surface; an adhesive layer 24 having an upper surface and a lower surface wherein the upper surface of the adhesive layer 24 is in contact with the lower surface of facestock 22; and a release coating 26 having an upper surface and a lower surface wherein the lower surface of the release coating is in contact with the upper surface of the facestock 22; and a release liner 28 having an upper and lower surface wherein the upper surface of the release liner 28 is in contact with the lower surface of the adhesive layer 24.

Figure 3:
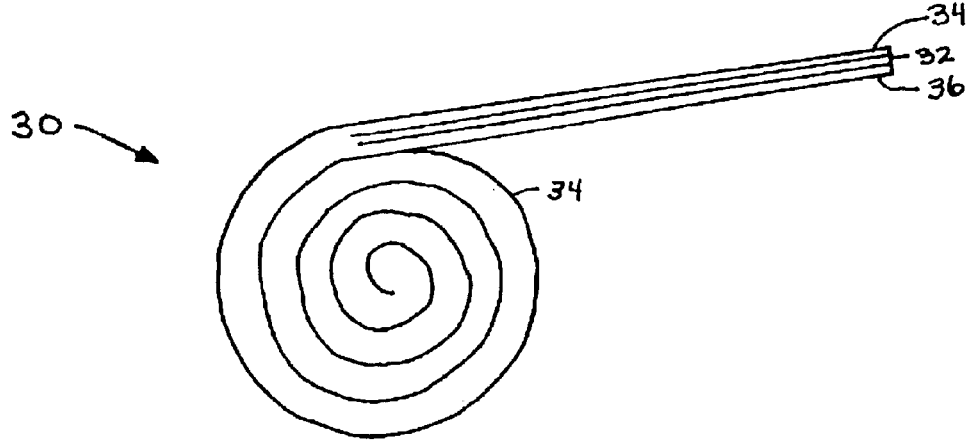
FIG. 3 is a schematic illustration of a side view of a dissolvable tape construction of the present invention in a wound configuration.

Once the release coating has been applied to upper surface of the facestock, and cured, the release liner can be stripped from the adhesive article and the adhesive article can be wound upon itself. The adhesive article can be converted into linerless dissolvable labels or slit and wound into a linerless dissolvable tape. As illustrated in FIG. 3, the linerless adhesive tape 30 comprises dissolvable facestock 32 coated on its upper surface with release layer 34, and on its lower surface with dissolvable adhesive 36. In the wound configuration, the lower surface of adhesive layer 36 of the trailing tape portion is in contact with the release layer 34 of the previously wound portion of the tape. Because of the release layer 34, the tape can be unwound without destroying the dissolvable facestock 32.

In addition to a wound configuration, the linerless labels of the present invention may be stored or dispensed from a stacked configuration. In the stacked configuration, the adhesive layer of a first upper label is in contact with the release coating of a second lower label.

EXAMPLE

An acrylic emulsion adhesive comprising a polymer prepared from copolymers 2-ethylhexylacrylate, butyl acrylate, vinyl acrylate, methyl acrylate, acrylic acid, vinylpyrrolidone, and 2-hydroxyethyl acrylate (Example 1 of WO 01/46329) is coated onto a silicone-coated 40 lb. supercalendared Kraft release liner and dried. The coat weight of the adhesive layer is 20 gsm (measured on a dried basis). A facestock of 37 lb. Mishima dissolvable paper 60MDP-S is then laminated to the adhesive coated release liner. The dissolvable paper facestock is then coated with a layer of a polyvinyl siloxane emulsion SM-3200 from General Electric blended with platinum catalyst SM-3010 also from General Electric, and then oven dried. The silicone emulsion is coated at a coat weight of about 1 gsm (measured on a dried basis) by reverse gravure coating. Following the oven-drying step, the silicone-coated dissolvable adhesive article is passed through chill rollers.

For manufacturing a dissolvable tape, the release liner is removed from the silicone-coated dissolvable adhesive article, and the adhesive article is then slit into a tape that is 1 inch wide and 20 to 30 yards long and wound onto itself in a linerless roll.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A linerless dissolvable pressure sensitive adhesive article comprising:
    a dissolvable facestock having an upper surface and a lower surface;
    a dissolvable adhesive layer having an upper and a lower surface wherein the upper surface of the adhesive layer is adhered to the lower surface of the dissolvable facestock;
    a release coating overlying the upper surface of the dissolvable facestock.

2. The lineriess dissolvable adhesive article of claim 1 wherein the facestock comprises a dissolvable paper.

3. The linerless dissolvable adhesive article of claim 1 wherein the facestock comprises a dissolvable polymeric film.

4. The linerless dissolvable adhesive article of claim 1 wherein the release coating comprises a silicone emulsion release material.

5. The linerless dissolvable adhesive article of claim 1 wherein the dissolvable adhesive layer comprises an acrylic adhesive.

6. The linerless dissolvable adhesive article of claim 5 wherein the dissolvable adhesive layer comprises an emulsion acrylic adhesive.

7. The linerless dissolvable adhesive article of claim 6 wherein the emulsion acrylic adhesive comprises a copolymer formed from a plurality of monomers comprising:
    (a) at least one alkyl (meth)acrylate;
    (b) at least one N-vinyl lactam monomer; and (c) at least one hydroxy (meth)acrylate ester;
wherein the copolymer has a weight average molecular weight less than about 120,000.

8. The linerless dissolvable adhesive article of claim 1 wherein the adhesive article is wound upon itself.

9. A dissolvable pressure sensitive adhesive article comprising
  a dissolvable facestock having an upper surface and a lower surface;
  a dissolvable adhesive layer having an upper and a lower surface wherein the upper surface of the adhesive layer is adhered to the lower surface of the dissolvable facestock;
  a release coating overlying the upper surface of the dissolvable facestock; and
a release liner removably adhered to the lower surface of the dissolvable adhesive.

10. The dissolvable adhesive article of claim 9 wherein the release coating comprises a silicone emulsion release material.

11. The dissolvable adhesive article of claim 9 wherein the dissolvable adhesive layer comprises an acrylic adhesive.

12. The dissolvable adhesive article of claim 11 wherein the dissolvable adhesive layer comprises an emulsion acrylic adhesive.

13. The dissolvable adhesive article of claim 12 wherein the emulsion acrylic adhesive comprises a copolymer formed from a plurality of monomers comprising:
  (a) at least one alkyl (meth)acrylate;
  (b) at least one N-vinyl lactam monomer; and
  (c) at least one hydroxy (meth)acrylate ester;
wherein the copolymer has a weight average molecular weight less than about 120,000.

14. A linerless dissolvable pressure sensitive adhesive article comprising:
  a dissolvable facestock having an upper surface and a lower surface;
  a dissolvable adhesive layer having an upper and a lower surface wherein the upper surface of the adhesive layer is adhered to the lower surface of the dissolvable facestock;
  a release coating overlying the upper surface of the dissolvable facestock, the release coating being derived from an emulsion of polyvinyl siloxane that is catalyzed on blending with a platinum catalyst.

15. A dissolvable pressure sensitive adhesive article comprising
  a dissolvable facestock having an upper surface and a lower surface;
  a dissolvable adhesive layer having an upper and a lower surface wherein the upper surface of the adhesive layer is adhered to the lower surface of the dissolvable facestock;
  a release coating overlying the upper surface of the dissolvable facestock, the release coating being derived from an emulsion of polyvinyl siloxane that is catalyzed on blending with a platinum catalyst; and
  a release liner removably adhered to the lower surface of the dissolvable adhesive.

* * * * *